United States Patent
Schulz

(10) Patent No.: US 8,434,938 B2
(45) Date of Patent: May 7, 2013

(54) MONITORING A TEMPERATURE AND/OR TEMPERATURE RELATED PARAMETERS OF AN OPTICAL ELEMENT

(75) Inventor: Joachim Schulz, Gerlingen (DE)

(73) Assignee: Trumpf Laser-und Systemtechnik GmbH, Ditzingen (DE)

(*) Notice: Subject to any disclaimer, the term of this patent is extended or adjusted under 35 U.S.C. 154(b) by 472 days.

(21) Appl. No.: 12/645,705

(22) Filed: Dec. 23, 2009

(65) Prior Publication Data

US 2010/0135356 A1    Jun. 3, 2010

Related U.S. Application Data

(63) Continuation of application No. PCT/DE2008/001053, filed on Jun. 27, 2008.

(30) Foreign Application Priority Data

Jun. 29, 2007 (DE) .................. 10 2007 030 398

(51) Int. Cl.
*G01J 5/00* (2006.01)
*G01N 25/20* (2006.01)

(52) U.S. Cl.
USPC ............... 374/130; 374/121; 374/43; 374/44

(58) Field of Classification Search ............ 374/130, 374/121, 43, 44
See application file for complete search history.

(56) References Cited

U.S. PATENT DOCUMENTS

| | | | | |
|---|---|---|---|---|
| 4,262,198 A | * | 4/1981 | Gupta et al. | 250/340 |
| 4,365,896 A | * | 12/1982 | Mihalow | 356/446 |
| 4,806,012 A | * | 2/1989 | Meltz et al. | 356/32 |
| 5,499,257 A | | 3/1996 | Nagano et al. | |
| 6,118,527 A | | 9/2000 | Jurca | |
| 7,023,538 B2 | | 4/2006 | Hutt et al. | |
| 7,193,700 B2 | | 3/2007 | Fliss | |

FOREIGN PATENT DOCUMENTS

| | | |
|---|---|---|
| DE | 3036682 | 4/1981 |
| DE | 19839930 | 9/1999 |
| DE | 20206255 | 8/2003 |
| DE | 10310854 | 9/2004 |
| EP | 1354664 | 10/2003 |
| EP | 1398612 | 3/2004 |
| EP | 1728582 | 12/2006 |
| JP | 59030032 | 2/1984 |
| JP | 59082184 | 5/1984 |
| WO | 2005030433 | 4/2005 |

OTHER PUBLICATIONS

International Search Report from corresponding PCT Application No. PCT/DE2008/001053, mailed Nov. 28, 2008, 13 pages. Notification of Transmittal of translation of the International Preliminary Report on Patentability for corresponding PCT Application No. PCT/DE2008/001053, issued Jan. 19, 2010, 8 pages.
Office Action from corresponding Chinese Application No. 200880022345.X, dated May 6, 2011, 5 pages, including English translation.
English translation of pertinent section of office action from German Application No. 10 2007 030 398.1, mailed Feb. 4, 2008, 3 pages.

* cited by examiner

*Primary Examiner* — Mirellys Jagan
(74) *Attorney, Agent, or Firm* — Fish & Richardson P.C.

(57) ABSTRACT

An apparatus for monitoring a temperature and/or a temperature-dependent parameter of an optical element arranged in a path of a laser beam includes a measuring light source to produce measuring radiation and direct the measuring radiation to the optical element, a detector arranged to detect a portion of the measuring radiation that has passed through a passage region of the optical element, an evaluating device connected to the detector to monitor the temperature and/or the temperature-dependent parameter. The evaluating device is configured to determine the temperature and/or the temperature-dependent parameter based on an intensity of the measuring radiation detected by the detector in the passage region.

22 Claims, 3 Drawing Sheets

US 8,434,938 B2

MONITORING A TEMPERATURE AND/OR TEMPERATURE RELATED PARAMETERS OF AN OPTICAL ELEMENT

CROSS REFERENCE TO RELATED APPLICATIONS

This application is a continuation of and claims priority under 35 U.S.C. §120 to PCT/DE2008/001053, filed on Jun. 27, 2008, and designating the U.S., which claims priority under 35 U.S.C. §119 to German Patent Application No. 10 2007 030 398.1, filed on Jun. 29, 2007. The contents of both the prior applications are hereby incorporated by reference in their entirety.

TECHNICAL FIELD

The present disclosure relates to monitoring a temperature and/or temperature related parameters of an optical element.

BACKGROUND

The functions of a beam guiding and beam shaping system in a high-power $CO_2$ laser system are to guide the laser beam as far as possible no loss of power and quality and to shape the beam to produce the desired power density distribution at the processing site. When selecting the optical elements, the particular requirements of the infrared $CO_2$ wavelength and the high power densities are to be taken into consideration. Owing to the long wavelength (>2 μm) of $CO_2$ lasers, beam guiding is carried out predominantly in free beam propagation by means of reflective, transmissive and partially transmissive optical elements and not by means of optical glass fibers since the attenuation losses are too great. For many applications there is the possibility of using both reflective and transmissive and/or partially transmissive optical elements.

At power densities above 1-2 $kW/cm^2$, reflective optical elements are preferably used since they have higher destruction thresholds and undergo less thermal deformation owing to the possibility of more effective cooling over the rear side of the optical elements. Transmissive and partially transmissive optical elements have the disadvantage that cooling may occur only over the edge of the optical elements, whereas in the case of reflective optical elements uniform cooling may occur over the rear side of the optical element. Uneven irradiation of an optical element with a maximum on the optical axis and cooling over the mounting at the edge of the optical element give rise to an extremely inhomogenous thermal load concentrated in the center of the optical element. Compared with transmissive optical elements, reflective optical elements have the disadvantage of greater sensitivity to adjustment. Furthermore, transmissive or partially transmissive optical elements, such as, for example, lenses, beam splitters and output mirrors, are indispensible as closure windows and protection windows of process gas chambers and for beam coupling and decoupling, since alternatives, such as, for example, aerodynamic windows, are comparatively expensive.

At the infrared wavelength of a $CO_2$ laser beam of 10.6 μm, only a few optical materials are available for transmissive optical elements. Zinc selenide (ZnSe) is predominantly used for transmissive optical elements. The advantages with that material are especially the small absorption coefficient and the low dependency of the refractive index on temperature. In comparison with zinc selenide, gallium arsenide (GaAs) has a higher absorption coefficient which, however, is compensated for by better thermal conductivity and mechanical strength. Further optical materials that are used for transmissive optical elements are quartz, BK7 glass and germanium.

Absorption of laser radiation at optical elements is unavoidable and is especially significant for transmissive and partially transmissive optical elements. An incident laser beam is absorbed in the basic material of the optical element, in the coatings and at impurities in or on the optical element and leads to heating of the optical element and alteration of the optical parameters including, but not limited to, refractive index and thermal conductivity. Dust particles or other contaminants, such as, for example, abrasion debris, that are present in a beam guiding chamber may be deposited on the surface of the optical elements and lead to increased absorption of the incident laser beam and hence to additional heating of the optical elements.

Since the beam guiding and beam shaping system has a great influence on the processing result, absorption constitutes a considerable source of error. This may be limited by making high-purity optical materials, by cooling the optical elements and by regular maintenance. Monitoring systems offer the opportunity to discover errors in good time and to reduce the downtimes of optical elements.

The expression "thermal lens effect" is used hereinafter to mean all the effects of absorption on an optical element that result in a change in the optical parameters and in a deterioration of the beam quality. A distinction is to be made between two phenomena: thermal runaway and thermal-optical deformation. Thermal runaway involves an exponential increase in the absorption coefficient with temperature, the consequence of which is that, above a limit temperature, more energy is absorbed than can be dissipated by means of cooling. Continuous heating with increasing absorption would ultimately lead to destruction of the optical element. Since greatly increased absorption is associated with poorer optical quality, the danger of thermal runaway can, in most cases, be recognized in good time and avoided. Thermal-optical deformation is used to mean a geometric deformation of the optical element owing to expansion of the volume as a function of temperature and a change in the refractive index.

The refractive index "n" is a temperature-dependent property of optical elements. Owing to that temperature dependency, a spatially inhomogeneous temperature distribution in an optical element can result in an incident laser beam being refracted to different degrees. With optical materials, a distinction is to be made between materials having a positive refractive index gradient (dn/dT>0) and materials having a negative refractive index gradient (dn/dT<0). In the case of a plane optical element, a temperature distribution having a maximum on the optical axis (e.g., Gaussian temperature distribution) and a positive refractive index gradient result in a focusing of the incident laser beam, whereas a negative refractive index gradient produces a widening of the laser beam. A focusing optical element produces a laser beam flow with a very small beam diameter (beam waist) at the focus of the optical element, and downstream of the beam waist the beam diameter increases. Heating of the optical element leads in the case of a positive refractive index gradient to the beam diameter being reduced in the region of the optical element as far as and just downstream of the beam waist as compared with a cold optical element, whereas the beam diameter becomes larger at intervals that are large relative to the focal length of the optical element as compared with a cold optical element. A negative refractive index gradient leads to the opposite effect, in the case of a heated optical element, i.e. the beam diameter in the region of the optical element as far as and just downstream of the beam waist increases as compared with a cold optical element, whereas the beam diameter decreases at intervals that are large relative to the focal length of the optical element.

Zinc selenide and gallium arsenide have temperature-dependent thermal conductivities and refractive indices and have positive refractive index gradients (dn/dT>0), and this leads to the refractive power of an optical element, and hence the focusing properties, changing with temperature. At high temperatures, the thermal conductivity falls, which leads to steeper temperature gradients with increasing temperature since the heat dissipation becomes poorer. Owing to the positive refractive index gradient for zinc selenide and gallium arsenide, the steeper temperature gradient results in an increased refractive power and hence in an altered propagation of the laser beam downstream of the optical element in comparison with a cold optical element. Partially transmissive decoupling optics, which decouple the laser beam from the laser resonator, and focusing lenses are subject to the highest thermal loads.

EP-A-1 398 612 describes an apparatus for monitoring the functionality of an optical element and is suitable especially for partially transmissive optical elements such as, for example, output mirrors of laser resonators. The monitoring apparatus includes a detector and a light source whose measuring radiation is at least partially reflected by the surface of the optical element facing the detector and the light source. A proportion of the measuring radiation is detected by the detector as a reflected measuring beam. The light source and the detector are diametrically opposite each other with respect to the optical element monitored and are arranged, in particular, at the same angle and to the side of the optical element.

DE-C 198 39 930 describes a method for monitoring the functionality of a transmissive protective element of a laser optical system which is transmissive to the laser wavelength and a device for carrying out that method. The object is to configure a method and a device for monitoring the functionality of a transmissive protective element of a transmissive laser optical system in such a manner that, in particular, crack formation or destruction of the protective element can be reliably detected. The monitoring device includes a detector, which is coupled to the lateral surface of the protective element and which detects light leaving the lateral surface, and a light source which is coupled to the lateral surface and which cooperates with the detector to form a light barrier. The measuring radiation of the light source is coupled into the protective element in a direction at an angle to the direction of incidence of the laser beam and crosses the protective element. After crossing the protective element, a proportion of the measuring radiation is detected by the detector as a transmitted measuring beam. To monitor the temperature of the transmissive protective element, radiation temperature sensors are provided which are intended to monitor the local temperature in different regions of the protective element by detecting the thermal radiation emanating from the protective element. Using different types of radiation temperature sensor it is possible to differentiate slow and rapid temperature changes. However, although the thermal radiation emitted by a transmissive body also depends on parts of the volume in the interior of the optical element, it is to a large extent determined from the surface temperature, which is why determination of the temperature in the interior of the optical element, in particular, is possible only with difficulty on the basis of the data provided by the radiation sensors.

SUMMARY

In certain aspects, the disclosure features an apparatus and a method which allow rapid, preferably local, monitoring of the temperature or temperature-dependent parameters, and especially their change with time, at an optical element.

In one aspect, an apparatus includes at least one measuring light source for producing measuring radiation and sending it onto the optical element, at least one detector for detecting at least a portion of the measuring radiation that has passed through the optical element and an evaluating device which is connected to the detector and which monitors the temperature and/or temperature-dependent parameter. The temperature or temperature-dependent parameter is correlated with the intensity of the detected measuring radiation, in a passage region of the measuring radiation based on a predefined relation between the intensity of the detected measuring radiation and the temperature and/or the temperature-dependent parameter in the passage region.

In some embodiments, the temperature or temperature-dependent optical parameters of the optical element can be deduced by way of the measured intensity of the measuring radiation that has passed through the optical element. This is possible because the absorption of the optical material of the optical element in the passage region is temperature-dependent, so that the intensity of the detected measuring radiation is dependent on the temperature. From a predefined, i.e. previously determined, relation between the intensity and the temperature or the temperature-dependent parameters which is stored in the evaluating device, it is therefore possible to determine the current operating condition of the optical element almost instantaneously, so that rapid changes and, if necessary, corrective measures may be initiated. For example, a change in refractive index may be detected on the basis of the temperature change which, in the case of an optical element serving as a focusing lens or as an output minor, would result in a shifting of the focus of the optical element.

In the measurement, the temperature or the temperature-dependent parameter can be obtained integrating the measured intensity over the length of the passage region. The detector is in this case preferably arranged, oriented and dimensioned in such a manner that it detects the entire measuring radiation passing through the optical element in a particular passage region. It will be appreciated that both the measuring light source and the detector can be arranged outside the beam path of the laser beam.

In some embodiments, the measuring light source is configured to produce measuring radiation at a measuring wavelength $\lambda M$ or in a measuring wavelength range of $\lambda M \pm \Delta \lambda$ that is different from the laser wavelength $\lambda L$. By virtue of the different wavelengths of the measuring radiation and the laser radiation, the detection of the measuring radiation may be performed using a wavelength-selective detector without the interfering effect of laser radiation scattered at the optical element and impinging on the detector. It will be appreciated that the measuring wavelength $\lambda M$ or the measuring wavelength range of $\lambda M \pm \Delta \lambda$ is selected here in such a manner that the optical element is also transmissive or partially transmissive to the measuring radiation.

In certain embodiments, the measuring light source is configured to produce measuring radiation at a measuring wavelength $\lambda M$ at which a relative deviation $|\lambda M - \lambda max|/\lambda max$ can be not more than 10%, and preferably not more than 5% with respect to a wavelength $\lambda max$ at which the change in the transmission of the optical element as a function of temperature is at a maximum. In this case, the measuring light source is configured to produce measuring radiation whose spectrum is concentrated at the measuring wavelength $\lambda M$.

In some cases, the at least one measuring light source may also be configured to produce measuring radiation in a measuring wavelength range of $\lambda M \pm \Delta \lambda$, in which the range can deviate by not more than 10%, and preferably by not more than 5%, from a wavelength $\lambda$max at which the change in the transmission of the optical element as a function of temperature is at a maximum. In this case, a broadband measuring light source is used, for example an LED, whose spectrum extends over a spectral range of $\lambda M \pm \Delta \lambda$ that is completely within an interval of $\lambda$max±10% or, respectively, $\lambda$max±5%. The detector is able to filter a suitable measuring range from that spectrum in order to determine the intensity.

In both of the cases described above, a high sensitivity of the measurement to changes in temperature or temperature-dependent parameters may be obtained and therefore the reaction time for initiating counter-measures may be reduced. In the case of the substrate materials typically used for transmissive or partially transmissive optical elements at laser wavelengths in the infrared range, the wavelength of the maximum transmission change is defined as follows: for zinc selenide (ZnSe), the wavelength at $\lambda$max=520 nm, for germanium at $\lambda$max=2 µm, for gallium arsenide at $\lambda$max=1000 nm, for BK7 glass at $\lambda$max=approx. 330 nm, and for quartz glass that wavelength is, depending on the material properties of the glass, from 170 to 240 nm or from 2.5 µm to 4 µm. When optical element surfaces are provided with anti-reflective or partially reflective coatings and are irradiated with measuring radiation, the measuring wavelength $\lambda M$ or the measuring wavelength range $\lambda M \pm \Delta \lambda$ for the particular material should be as close as possible to the wavelengths mentioned above in order to take their wavelength-dependent influence into account where applicable, since they may possibly alter the wavelength of the maximum transmission change.

In some embodiments, for monitoring the temperature of an optical element that includes, at least in the passage region of the measuring radiation, zinc selenide, the measuring light source is configured to produce measuring radiation at a measuring wavelength $\lambda M$ from 510 nm to 535 nm, preferably at 532 nm, or in a measuring wavelength range of $\lambda M \pm \Delta \lambda$ in the range of 520 nm±52 nm, preferably 520 nm±26 nm. That wavelength range is close to the maximum change in the transmission at the absorption edge of zinc selenide. Commercially available laser diodes can produce a measuring radiation having a wavelength at 532 nm. It is also possible to use broadband LEDs as the light sources, give that the broadband LEDs produce measuring radiation in a wavelength range of $\lambda M \pm \Delta \lambda$ around $\lambda$max=520 nm.

In some embodiments, the measuring light source sends measuring radiation onto a lateral surface of the optical element, in which the lateral surface is not arranged in the beam path of the laser beam and is typically a cylindrical lateral surface extending around the optical element. The measuring radiation passes through the optical element in this case perpendicular or almost perpendicular to the main propagation direction of the laser beam. With this measuring method, also referred to hereinafter as radial transillumination, given the typical dimensions of optical elements perpendicular to the laser beam of approximately 20-50 mm, an especially long absorption length is available. Accordingly, a temperature-dependent transmission change can easily be recognized. Owing to the integral information over the passage length corresponding to the diameter of the optical element, a single intensity signal may be sufficient for monitoring the temperature of the optical element. At the beam entry and beam exit regions of the measuring radiation, the normally matte side edge of the optical element is polished. In order to further increase the absorption length, the measuring radiation may, in addition, be at least partially reflected one or more times at the side edge of the optical element between the beam entry and the beam exit. To increase the proportion of reflected measuring radiation, the side edge may be provided with a reflective coating at the appropriate locations or, where appropriate, an angle of incidence of the measuring radiation onto the edge of the optical element permitting total reflection may be selected.

In some embodiments, the apparatus includes a mounting for the optical element, in which the mounting of at least one measuring light source and/or at least one detector are integrated. This produces a compact measuring arrangement that is suited to radial transillumination since the detector and the measuring light source are arranged in direct proximity to the optical element at the side thereof and, in addition, are protected from the laser radiation by the mounting.

In some embodiments, at least one measuring light source sends measuring radiation onto an optical surface of the optical element, in which the optical surface is arranged at least partially in the beam path of the laser beam. In this case, the optical element may be transilluminated almost parallel to the main propagation direction of the high-power laser beam, which is also referred to hereinafter as axial or almost axial transillumination. In this case, the measuring radiation enters the optical element and leaves it again at the same optical surfaces as the laser beam. The measuring radiation may in this case be preferably sent in a directed way onto the optical element almost parallel to the main propagation direction of the laser beam, so that the detected, integral intensity in the passage region through the optical element is substantially dependent on the absorption in a point of the optical element at which the temperature may be determined. In particular, it is advantageous in this case to transilluminate the central region of an optical element in the vicinity of its axis of symmetry, since it is there that the temperature of the optical element is particularly high owing to the cooling which takes place at the edge.

The anti-reflection coatings applied to the optical surfaces normally include a multi-layer system with a number of alternating layers of high and low refractive index in order to suppress the reflection of radiation at the laser wavelength by interference effects. Such anti-reflective coatings normally have a highly modulated wavelength dependency for radiation in the visible range, but do not interfere with the measurement in this case and may, if appropriate, be exploited when relative changes in the transmission or temperature are to be monitored since they may intensify the temperature dependency of the transmission.

In some embodiments, at least one further measuring light source and/or at least one beam splitting device for the radiation of the measuring light source(s) is/are provided in order to send measuring radiation in a directed way onto at least two points of a surface of the optical element. In that manner, in the case of an axial measurement at a plurality of points of the area, the temperature of the optical element may be locally determined or, in the case of a radial measurement, it is possible to determine temperature gradients in the optical element.

In some embodiments, at least one measuring light source is configured to produce measuring radiation in a divergent light beam. In this case, the temperature or the temperature-dependent parameter may be determined at a large number of locations on the optical element if the intensity of the measuring radiation that has passed through is determined with a correspondingly large number of detectors or with an area array detector.

In some embodiments, at least one detector is an area array detector, preferably a CCD camera. An area array detector is understood as being a detector that provides spatially resolved information of the detected intensity of the measuring radiation. By suitable calibration of the intensity distribution, the thermal lens of the optical element may in this case be monitored over a large region, preferably the entire area of the optical element.

In some embodiments, the evaluating device is configured to determine a temperature gradient and/or a gradient of a temperature-dependent parameter in the optical element by comparing the intensity of measuring radiation that has passed through the optical element in a first passage region with the intensity of measuring radiation that has passed through the optical element in a second passage region. In this case, counter-measures may be initiated when a given threshold for the gradient of the temperature or temperature-dependent parameter is exceeded.

In some embodiments, a regulating device for regulating the temperature of the optical element to a predefinable operating temperature and a cooling device for cooling the optical element, which is controlled by the regulating device, are provided. The actual temperature of the optical element may be ascertained in the manner described above and may be regulated to the desired temperature by means of the cooling device. As the cooling device, channels through which a coolant flows may be provided in the mounting of the optical element. Alternatively, electrical cooling elements, for example Peltier elements, may also be used.

In some embodiments, a regulating device for regulating the focal position of the laser beam, which may be focused by at least one adaptive mirror, is provided. Regulating the focal position can include controlling the focusing properties of the adaptive mirror using the regulating device. In particular, the curvature of the adaptive mirror may be altered for this purpose by the adaptive mirror being acted upon at its rear side by a fluid (e.g., water), so that the curvature of the mirror changes as a function of the water pressure. By controlling the water pressure it is possible in this case to compensate for a shifting of the focal position caused by temperature changes in the optical element.

In some embodiments, the apparatus has a laser beam source for producing a laser beam having a wavelength $\lambda L$ in the infrared wavelength range, especially at $\lambda L=10.6$ μm, and preferably at a power density of 1 kW/cm$^2$ or above. An optical element arranged in the beam path of such a laser beam source is subject to especially high thermal load, and therefore monitoring of the temperature or temperature-dependent parameters, and especially local differences therein, is advisable.

In another aspect, a method can include: producing measuring radiation and sending the measuring radiation onto the optical element to be monitored, detecting at least a portion of the measuring radiation that has passed through the optical element, and monitoring a temperature and/or temperature-dependent parameter. The temperature and/or temperature-dependent parameter is correlated with the intensity of the detected measuring radiation, in a passage region of the measuring radiation based on a predefined relation between the intensity of the detected measuring radiation and the temperature and/or temperature-dependent parameter in the passage region. In some cases, the temperature-dependent absorption or transmission of the optical element in the passage region, which is manifested as a change in the intensity of the detected measuring radiation, can be used to monitor the temperature and/or to monitor temperature-dependent parameters of the optical element. Advantageous variants of the method are indicated in the claims; regarding the advantages associated with those variants, reference is made to the above description in connection with the apparatus for monitoring the temperature.

The details of one or more embodiments of the invention are set forth in the accompanying drawings and the description below. Other features and advantages will be apparent from the description and drawings, and from the claims. The features mentioned above and the features set forth hereinafter may also be used individually or a plurality thereof may be used in any desired combination. The embodiments shown and described are not to be understood as forming a definitive list, but rather are of the nature of examples for illustrating the invention.

DETAILED DESCRIPTION

Figure 1:
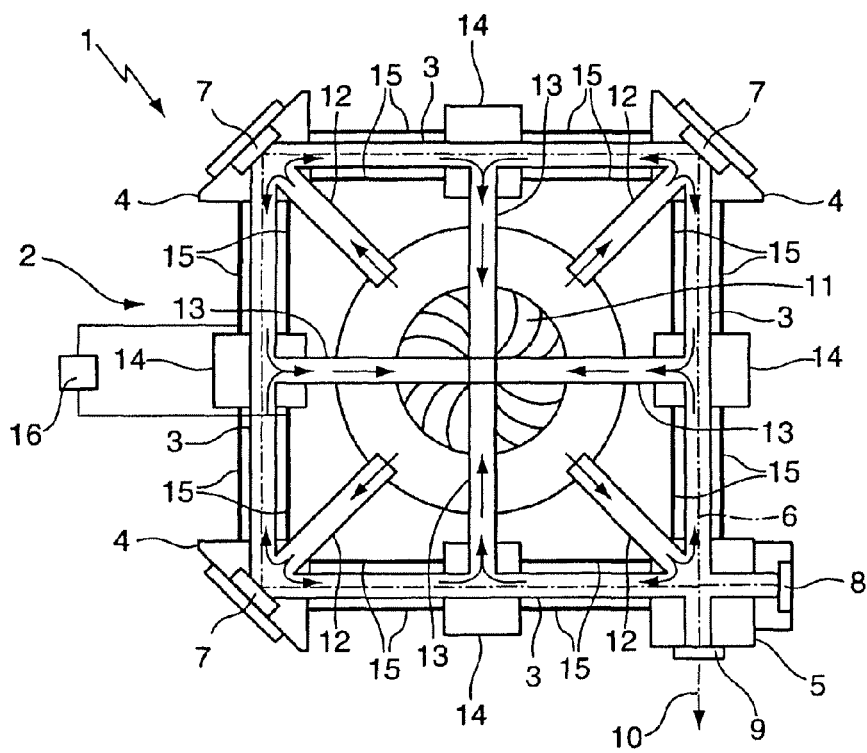
FIG. 1 shows a $CO_2$ gas laser having a folded laser resonator.

The $CO_2$ gas laser 1 shown in FIG. 1 has a square-folded laser resonator 2 with four mutually adjoining laser discharge tubes 3 connected to one another by corner housings 4, 5. A laser beam 6 extending in the direction of the axes of the laser discharge tubes 3 is shown by a dot-dash line. Diverting mirrors 7 in the corner housing 4 serve to divert the laser beam 6 by 90° in each case. Arranged in the corner housing 5 are a retro mirror 8 (e.g., retro-reflective mirror) and a partially transmissive output mirror 9. The retro mirror 8 is configured to be highly reflective and reflects the laser beam 6 through 180° so that it passes through the laser discharge tubes 3 again in the opposite direction. Part of the laser beam 6 is decoupled from the laser resonator 2 at the partially transmissive output mirror 9, while the other part remains in the laser resonator 2 and passes through the laser discharge tubes 3 again. The laser beam decoupled from the laser resonator 2 via the output mirror 9 is denoted by 10. In the center of the folded laser resonator 2, a radial fan 11, in communication with the corner housings 4, 5 via supply lines 12 for laser gas, is arranged as a pressure source for laser gas. Extraction lines 13 extend between extractor housings 14 and the radial fan 11. The direction of flow of the laser gas in the interior of the laser discharge tubes 3 and in the supply and extraction lines 12, 13 is illustrated by arrows. The laser gas is excited by means of electrodes 15 arranged adjacent to the laser discharge tubes 3 and connected to an RF generator 16.

Figure 2:
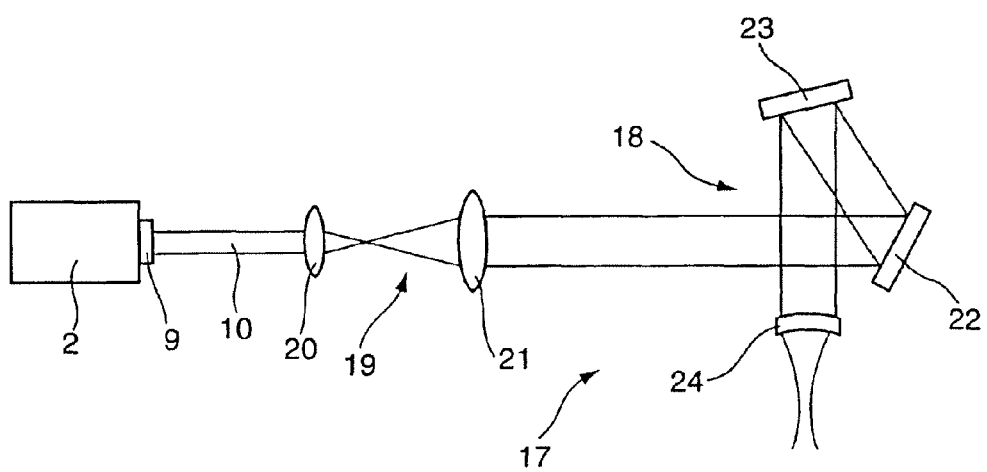
FIG. 2 shows a $CO_2$ gas laser with an external beam guide and a processing head.

In order that the laser beam 10 decoupled from the laser resonator 2 may be used as a processing tool, as shown in FIG. 2, the laser beam 10 is guided in an external beam guide 17 via reflecting and transmissive optical elements, such as, for example, mirrors and lenses, from the laser resonator 2 to a processing head 18 in which focusing of the laser beam 10 takes place. The decoupled laser beam 10 is widened to a desired beam diameter by means of a beam telescope 19 configured as a lens telescope having two lenses 20, 21, and is diverted to the processing head 18 by a diverting mirror 22. As shown in FIG. 2, the processing head 18 may be configured as a lens head and includes in that case a diverting mirror 23 and a focusing lens 24 which focuses the laser beam to a beam diameter required for the processing operation. Alternatively, the processing head 18 may be configured as a mirror head with a focusing mirror which diverts the laser beam in the direction of the workpiece and focuses it to the required beam diameter (not shown).

At the output mirror 9 of the laser resonator 2 of FIG. 1, the laser beam 10 produced in the laser resonator 2 impinges on a first optical surface of the output mirror 9 at which a portion of the laser beam 10, for example 30%, is transmitted and the remaining approximately 70% is reflected while a small portion is also absorbed. To enable the laser beam 10 to pass through the output mirror 9, the basic material thereof consists of zinc selenide which is transparent at a laser wavelength $\lambda L$ equal to about 10.6 µm. In the region of the output mirror, the laser beam 10 has a relatively small beam cross-section, which is why an especially high power density of more than 1 kW/cm2 can be obtained. The high power density can result in particularly intense thermal loading of the basic material of the output mirror 9 in the passage region of the laser beam 10. Accordingly, to avoid damage due to excessively high thermal stresses and/or excessively high temperatures, a temperature behavior of the output mirror 9 is preferably monitored.

Figure 3A:
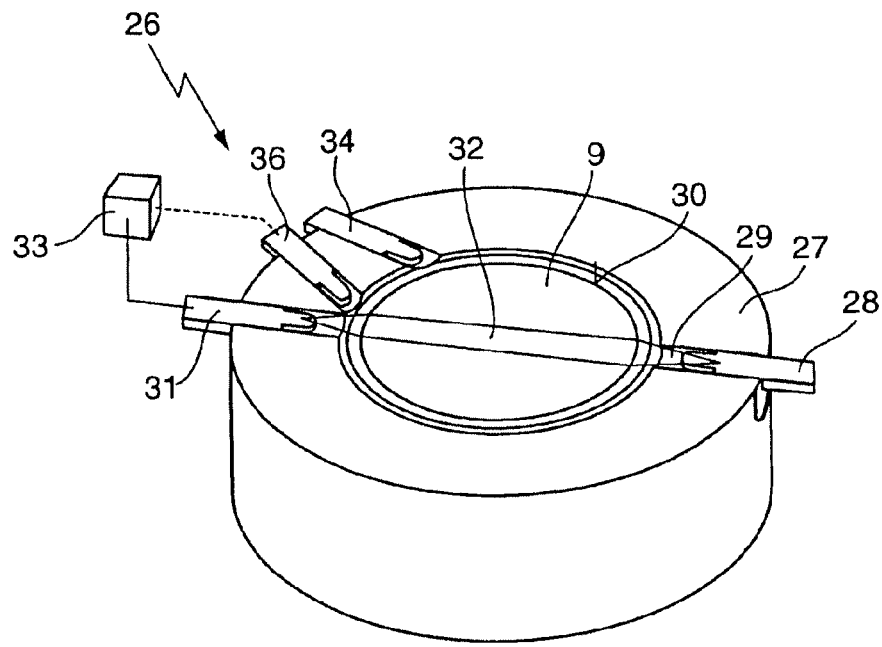
FIGS. 3a and 3b each show a monitoring apparatus.
Figure 3B:
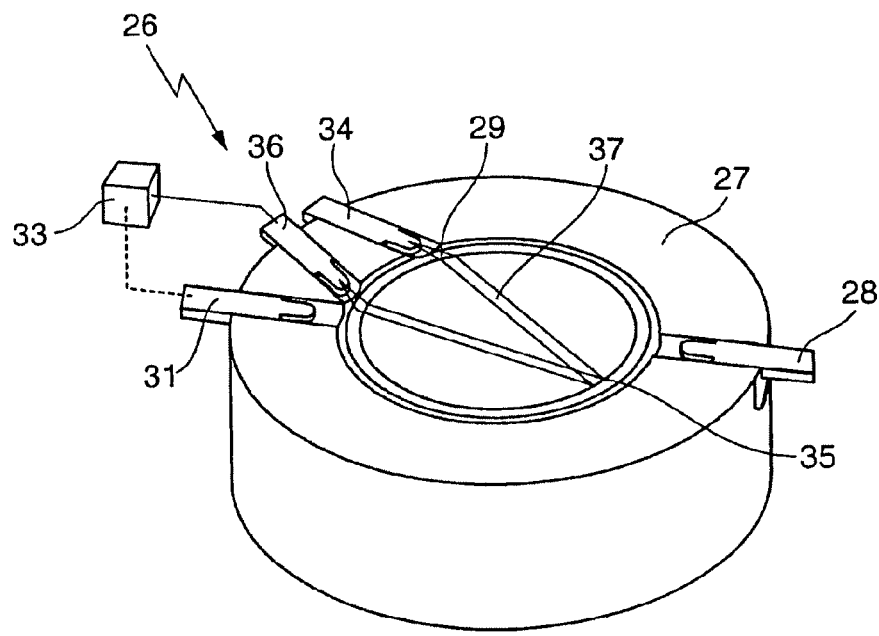

FIGS. 3a and 3b each show a monitoring apparatus 26 integrated in a mounting 27 for the output mirror 9 in which the monitoring apparatus 26 is suitable for monitoring a temperature behavior of the mirror 9. The monitoring apparatus 26 has a measuring light source 28 integrated in the mounting 27 for producing measuring radiation 29 and sending it onto a lateral surface 30 of the output mirror 9. The monitoring apparatus 26 also includes a detector 31, integrated diametrically opposite the measuring light source 28 in the mounting 27, which detects the intensity of the measuring radiation 29 that has passed through the output mirror 9 in a first passage region 32 and which is connected to an evaluating device 33. The detected intensity of the measuring radiation 29 is proportional to the amount of light transmitted by the output mirror 9 in the first passage region 32. The amount of transmitted light is, in turn, dependent on the temperature of the basic material of the output mirror 9. Therefore, from the intensity of the measuring radiation 29, it is possible to deduce the temperature and/or further temperature dependent parameters in the first passage region 32. For that purpose, a relation between the intensity of the measuring radiation 29 and the temperature in the first passage region 32 and/or a temperature-dependent parameter (such as refractive index or thermal conductivity, among others) is stored in the evaluating device 33, for example, in the form of a table. Such a relation may be derived with the aid of calibration measurements carried out on the output mirror 9 or on the basis of calculations or measurements of the temperature-dependent absorption behavior of the basic material of the output mirror 9. If the parameter determined in the manner described above deviates from a desired quantity, a correction may be made.

By virtue of the measuring light source 28 and the detector 31 being arranged at diametrically opposite locations on the lateral surface 30, the length of passage of the measuring radiation 29 through the output mirror 9 and, thus the absorption, is maximized. This enables an increase in a sensitivity of the monitoring apparatus 26 to temperature changes to be achieved. As shown in FIG. 3b, to further increase the length of passage and hence the sensitivity of the apparatus 26, measuring radiation 29 produced by a second measuring light source 34 may also be reflected, after entering the output mirror 9, at a location 35 on the lateral surface 30. The intensity of the reflected measuring radiation 29 may be detected in a second detector 36 which is integrated in the mounting 27, adjacent to the second measuring light source 34. With the arrangement shown in FIG. 3b, a second passage region 37 for the measuring radiation 29 is produced, which has a passage length that is almost twice as great as the passage length of the first passage region 32 of FIG. 3a and with which an evaluation may likewise be made in the manner described above.

By comparing the intensity of the measuring radiation 29 that has passed through the output mirror 9 in the first passage region 32 (and which is detected by the first detector 31) with the intensity of the measuring radiation 29 that has passed through the output mirror 9 in the second passage region 37, it is possible to determine—taking into consideration the different passage lengths—a temperature gradient and/or a gradient of a temperature-dependent parameter in the output mirror 9, such as a refractive index gradient. The refractive index gradient permits inferences to be made regarding changes that may occur in the beam diameter of the laser beam 10 after passage through the output mirror 9. It will be appreciated that, to determine such a gradient, both the first measuring light source 28 and the second measuring light source 34 may be operated simultaneously.

The sensitivity of the monitoring apparatus 26 may also be increased by selecting a measuring wavelength $\lambda M$ of the measuring radiation 29 such that a temperature change in the basic material of the output mirror 9 results in a large change in the intensity of the detected measuring radiation 29. For that purpose, the measuring light sources 28, 36 can be configured as laser diodes that produce measuring radiation at a wavelength $\lambda M$ of 532 nm, which is close to an absorption edge of zinc selenide at $\lambda MAX=520$ nm at which the change in transmission is at a maximum in that material. It will be appreciated that, when optical elements made of other materials are used, the measuring wavelength $\lambda M$ of the measuring radiation should be selected to correspond to the wavelength associated with the maximum transmission change. Such selection may also be performed when the measurement is performed through an anti-reflection coating on the surface of the optical element, since that coating may alter the transmission depending on the wavelength.

Figure 4A:
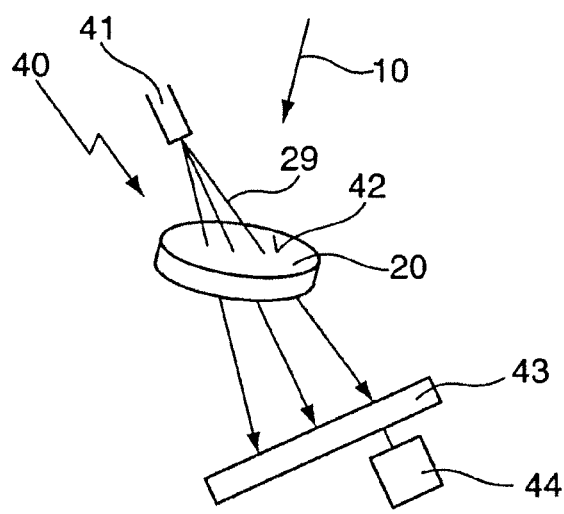
FIGS. 4a and 4b each show a monitoring apparatus.

In addition to the radial transillumination of the output mirror 9 shown in FIGS. 3a,b, it is also possible to carry out axial transillumination of optical elements, as shown by way of example in FIGS. 4a,b with reference to the first lens 20 of the telescope arrangement 19 of FIG. 2.

In FIG. 4a, an apparatus 40 for temperature monitoring is shown, which has a measuring light source 41 that causes the measuring radiation 29 to impinge on an optical surface 42 of the lens 20 in a divergent beam. The measuring radiation 29 that has passed through the lens 20 is detected by a CCD camera forming the detector 43 and the radiation intensity thereof is evaluated by an evaluating device 44 in order to monitor the temperature. The monitoring apparatus 40 permits such monitoring of the lens 20 over a majority of the region penetrated by the laser beam 10. By virtue of the CCD camera as a location-dependent detector 43, a spatially resolved determination of the temperature or a temperature-dependent parameter of the lens 20 is possible at a large number of array points, in the form of integral information over the passage length, and, hence, allowing the determination of temperature gradients.

Figure 4B:
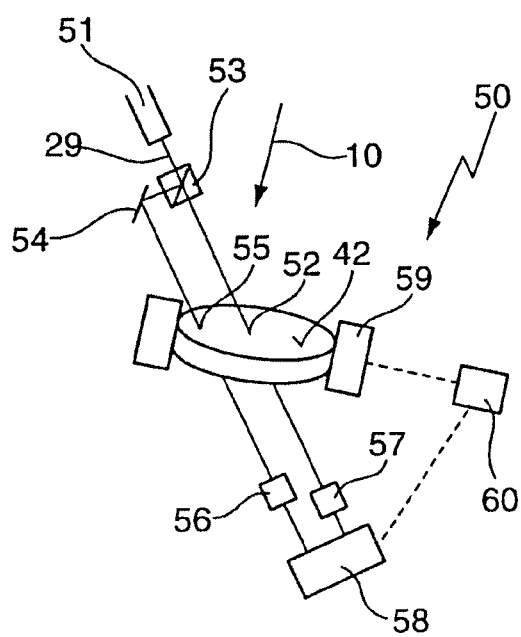

A further monitoring apparatus 50 for monitoring the temperature of the lens 20 by means of axial transillumination is shown in FIG. 4b. In this implementation, a measuring light source 51 is provided, which produces measuring radiation 29 in a directed way of which a first part is irradiated onto a first point 52 on the lens 20. At a beam splitting device 53, a second part of the measuring radiation 29 is decoupled, for example by polarization selection, and is irradiated via a diverting mirror 54, parallel to the first part of the measuring radiation 29, onto a second point 55 on the surface 42 of the lens 20. The parts of the measuring radiation 29 respectively impinging on the lens 20 at the two points 52, 55 are detected in two detectors 56, 57 provided for the detection of the respective part of the measuring radiation 29 and are evaluated in an evaluating device 58 for monitoring the temperature. By comparing the intensity measured by the two detectors 56, 57, it is possible to determine, as described above, a temperature gradient or a gradient of a temperature-dependent parameter (e.g., refractive index gradient) in the lens 20 and, if a threshold value is exceeded, initiate counter-measures to prevent a change in the refraction properties of the lens 20.

For that purpose, a cooling device 59 attached to the outer edge of the lens 20 and extending around it, in which a coolant is passed through cooling channels (not shown), is connected to a regulating device 60 which uses the information of the evaluating device 58 regarding the temperature-dependent parameters to regulate the temperature of the lens 20 and in that manner optimize the parameters thereof. By dispensing with an area array detector, the monitoring apparatus 50 of FIG. 4b may be of a more compact configuration than the monitoring apparatus 40 shown in FIG. 4a and is therefore suitable, for example, for integration in the processing head 18 of FIG. 3a to monitor the focusing lens 24.

In addition to regulating the temperature-dependent parameters directly at the lens 20, it is also possible for other effects (e.g., a change in focal position of the laser beam 10) caused by the changes in temperature or temperature-dependent parameters in the beam guiding system 17 to be compensated at other optical elements. For that purpose, the diverting mirror 23, for example, may be configured to be adaptive and may be acted upon by cooling water from the rear side so that it changes its curvature and hence its focusing properties as a function of the pressure of the cooling water. By means of a regulating unit (not shown), which controls the pressure of the cooling water, it is possible in that manner to compensate for shifting of the focal position caused by differential heating of the lens 20. Compensation for the temperature-dependent alteration of the focal position is also possible in a different manner, for example, by moving optical elements that affect the focal position, such as the second lens 21 of the telescope arrangement 19 or also the lens 20 itself, along the propagation direction of the laser beam 10. To regulate the focal position, it is especially appropriate to monitor the temperature-dependent properties of the focusing lens 24 and, if necessary, move that lens also in the propagation direction of the laser beam 10 by means of suitable movement units.

The monitoring apparatuses 26, 40, 50 may be used not only to monitor the output mirror 9 or the lens 20 of the telescope arrangement 19, but also to monitor other transmissive or partially transmissive optical elements, given that it is possible to carry out axial and radial transillumination in combination on a single optical element. When monitoring apparatuses of the kind described above or monitoring apparatuses suitably modified for the relevant application are used, it is possible to respond more or less instantaneously to temperature changes and/or changes to temperature-dependent parameters. When the temperature of optical elements provided in beam guiding systems of high-power laser systems is monitored, the quality obtained in the laser processing operation may be increased.

A number of embodiments have been described. Nevertheless, it will be understood that various modifications may be made without departing from the spirit and scope of the invention. Accordingly, other embodiments are within the scope of the following claims.

What is claimed is:

1. An apparatus for monitoring a temperature and/or a temperature-dependent parameter of an optical element arranged in a beam path of a $CO_2$ laser beam having a wavelength $\lambda L$ in an infrared wavelength range, the apparatus comprising:
   the optical element arranged in the beam path of the $CO_2$ laser beam, wherein the optical element is at least partially transparent to light at the wavelength $\lambda L$ of the $CO_2$ laser beam to allow the $CO_2$ laser beam to at least partially transmit through the optical element;
   a measuring light source configured to produce measuring radiation at a measuring wavelength $\lambda M$ and direct the measuring radiation to the optical element, wherein the measuring wavelength $\lambda M$ is different from the wavelength $\lambda L$ or is in a measuring wavelength range of $\lambda M \pm \Delta \lambda$ that does not coincide with the laser beam wavelength $\lambda L$;
   a detector arranged to detect a portion of the measuring radiation that has passed through a passage region of the optical element; and
   an evaluating device connected to the detector to monitor the temperature and/or the temperature-dependent parameter of the optical element,
   wherein the evaluating device is configured to determine the temperature and/or the temperature-dependent parameter based on an intensity of the measuring radiation detected by the detector in the passage region.

2. The apparatus according to claim 1,
   wherein a relative deviation of the measuring wavelength $\lambda M$ with respect to a maximum wavelength $\lambda max$ is not more than about 10%, and
   wherein the maximum wavelength $\lambda max$ corresponds to a wavelength at which a change in transmission of the optical element as a function of temperature is a maximum.

3. The apparatus according to claim 1,
   wherein the measuring wavelength range deviates from a maximum wavelength $\lambda max$ by no more than about 10%, and
   wherein the maximum wavelength $\lambda max$ corresponds to a wavelength at which the change in the transmission of the optical element as a function of temperature is at a maximum.

4. The apparatus according to claim 1, wherein the optical element comprises zinc selenide, the measuring wavelength $\lambda M$ is between about 510 nm to about 535 nm or the measuring wavelength range $\lambda M \pm \Delta \lambda$ is equal to about 520 nm±52 nm.

5. The apparatus according to claim 1, wherein the measuring light source is configured to direct measuring radiation onto a lateral surface of the optical element and wherein the lateral surface is not arranged in the path of the laser beam.

6. The apparatus according to claim 1, further comprising a mounting for the optical element, wherein the measuring light source and/or the detector are/is integrated into the mounting.

7. The apparatus according to claim 1, wherein the measuring light source is configured to direct measuring radiation onto an optical surface of the optical element, and wherein the optical surface is arranged at least partially in the path of the laser beam.

8. The apparatus according to claim 1, wherein the measuring light source and/or a beam splitting device for the light of the measuring light source are/is configured to direct measuring radiation onto at least two points of a surface of the optical element.

9. The apparatus according to claim 1, wherein the measuring light source is configured to produce measuring radiation in a divergent light beam.

10. The apparatus according to claim 1, wherein the detector is an area array detector.

11. The apparatus according to claim 1, wherein the passage region comprises a first passage region and a second passage region and wherein the evaluating device is configured to compare the intensity of measuring radiation that has passed through the optical element in the first passage region with the intensity of measuring radiation that has passed through the optical element in the second passage region.

12. The apparatus according to claim 1, further comprising:
a regulating device to regulate the temperature of the optical element to a predetermined operating temperature; and
a cooling device, controlled by the regulating device, to cool the optical element.

13. The apparatus according to claim 1, further comprising an adaptive mirror to focus the laser beam to a focal position; and
a regulating device to regulate the focal position of the laser beam, wherein the regulating device is configured to control a focusing property of the adaptive mirror.

14. The apparatus according to claim 1 further comprising a laser beam source to produce the laser beam.

15. The apparatus according to claim 1, wherein the optical element is configured to allow the $CO_2$ laser beam to enter the optical element at a first optical surface and exit the optical element at a second optical surface.

16. The apparatus according to claim 1, wherein the optical element is configured to allow the measuring radiation to enter the optical element at a first optical surface and exit the optical element at a second optical surface.

17. A method for monitoring a temperature and/or a temperature-dependent parameter of an optical element arranged in a path of a $CO_2$ laser beam having a wavelength $\lambda L$ in an infrared wavelength range, the method comprising:
generating measuring radiation at a measuring wavelength $\lambda M$, wherein the measuring wavelength $\lambda M$ is different from the wavelength $\lambda L$ or is in a measuring wavelength range of $\lambda M \pm \Delta \lambda$ that does not coincide with the laser beam wavelength $\lambda L$;
directing the measuring radiation onto the optical element arranged in the path of the $CO_2$ laser beam, wherein the optical element is at least partially transparent to light at the wavelength $\lambda L$ to allow the $CO_2$ laser beam to at least partially transmit through the optical element;
detecting a portion of the measuring radiation that has passed through the optical element; and
monitoring the temperature and/or temperature-dependent parameter, wherein the temperature and/or temperature-dependent parameter are/is based on an intensity of the detected measuring radiation in a passage region.

18. The method according to claim 17, wherein a relative deviation of the measuring wavelength $\lambda M$ with respect to a maximum wavelength $\lambda$max is not more than about 10%, and wherein the maximum wavelength $\lambda$max corresponds to a wavelength at which a change in transmission of the optical element as a function of temperature is a maximum.

19. The method according to claim 17, wherein a relative deviation of the measuring wavelength range with respect to a maximum wavelength $\lambda$max is not more than about 10%, and wherein the maximum wavelength $\lambda$max corresponds to a wavelength at which a change in transmission of the optical element as a function of temperature is a maximum.

20. The method according to claim 17, wherein the measuring radiation enters the optical element at a first optical surface and exits the optical element at a second optical surface.

21. The method according to claim 17, wherein the $CO_2$ laser beam is partially transmitted through the optical element.

22. The method according to claim 21, wherein the $CO_2$ laser beam enters the optical element at a first optical surface and exits the optical element at a second optical surface.

* * * * *